Figure 1:
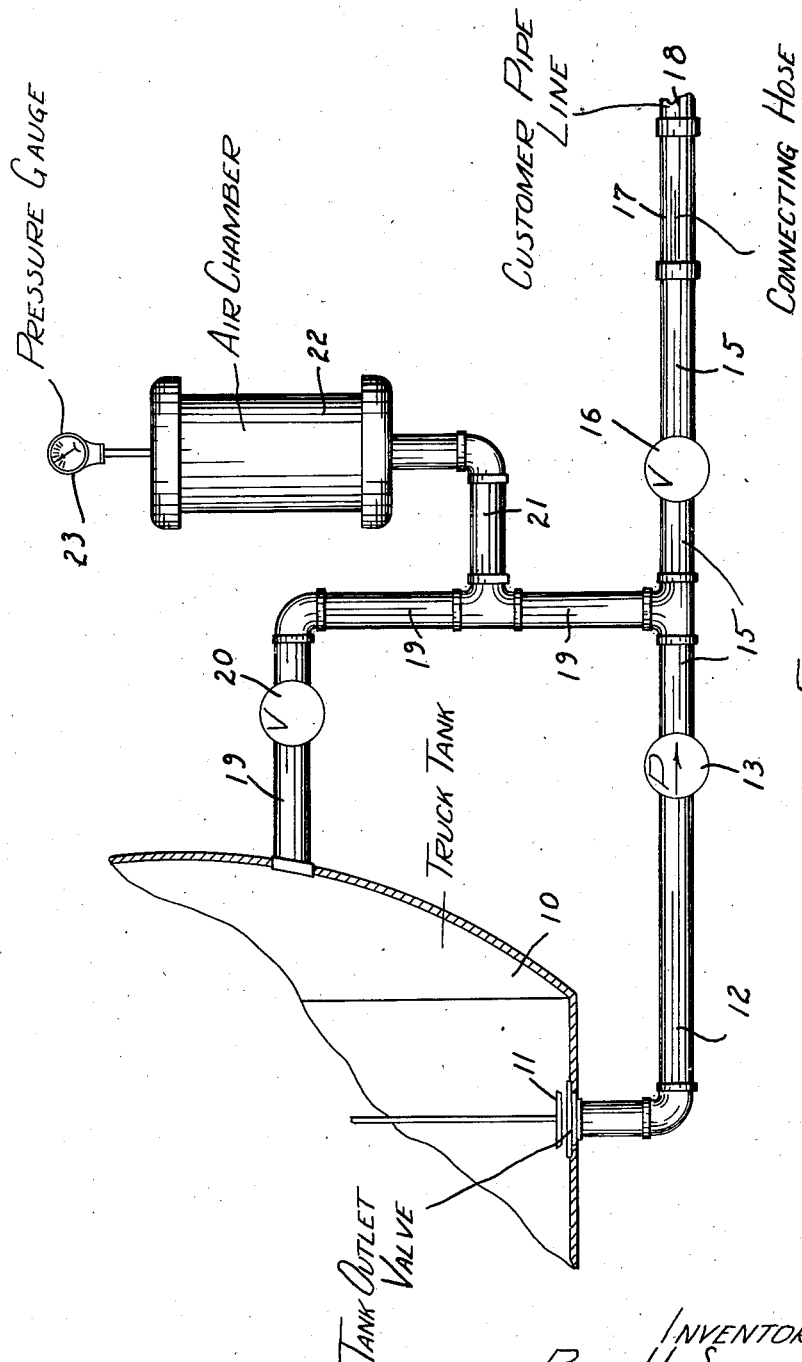

Oct. 12, 1943.                P. H. STAMBAUGH                2,331,435
          METHOD AND MEANS FOR STARTING AND MAINTAINING
                       FLOW OF VISCOUS FLUIDS
               Filed Nov. 17, 1941            3 Sheets-Sheet 3

INVENTOR,
PAUL H. STAMBAUGH,
BY Minturn & Minturn,
    ATTORNEYS.

Patented Oct. 12, 1943

2,331,435

UNITED STATES PATENT OFFICE 2,331,435

METHOD AND MEANS FOR STARTING AND MAINTAINING FLOW OF VISCOUS FLUIDS

Paul H. Stambaugh, Columbus, Ind., assignor to Union Starch & Refining Company, Columbus, Ind., a corporation of Indiana Application November 17, 1941, Serial No. 419,390

2 Claims. (Cl. 103—41)

This invention relates to a method and to means for delivering sticky, glue-like, viscous fluids, such as corn syrup, through a pipe line normally initially at a lower temperature than that of the fluid to be delivered. Without limiting the invention, one specific instance of the advantage of the invention is found in the situation where corn syrup is to be delivered from a distributing station by truck tank to a customer's plant which is equipped with a pipe line running from a suitable intake, generally on the outside of the plant, to a supply tank within the plant which may be located on a floor several stories above the intake point. Under such conditions, obviously the pipe line will contain a quantity of corn syrup from the last delivery, and this corn syrup will have a temperature substantially the same as that of the pipe line and its immediate surroundings, so that under normal conditions this corn syrup will be at a temperature much below that permitting ready flow, and accordingly this corn syrup will so adhere to the inside of the pipe line and be so viscous that an extremely great pressure would be required to effect immediate flow in the pipe line.

Heretofore the discharge of a truck tank has been interconnected with this plant pipe line and the truck carried pump set into operation in an attempt to apply sufficient pressure to the corn syrup in the pipe line to permit introduction therebehind of the warm and more fluid corn syrup carried in the truck tank. The result has been that the truck operator was in quite a dilemma because, if he permitted the truck engine to drive the pump in direct connection therewith, the truck engine would slow, or some part of the pump driving mechanism would shear, with the result that the truck operator would have to play along with the truck engine to slip the driving clutch or the like, and in general take up a considerable period of time before he could establish a flow of corn syrup through the pipe line.

It is to be understood that the corn syrup carried by the truck tank is in that heated or warm state permitting ready pumping thereof, the corn syrup having been previously heated at the distributing point and the truck tank under certain weather conditions being insulated so as to conserve that heat.

In arriving at the present invention, I conceived the condition that if a steady relatively low pressure be applied at the intake end of said pipe line, and that pressure be maintained sufficiently long, the colder syrup in that pipe line would eventually start flowing to permit the entrance of the warmer syrup requiring less pressure to pump through that line by reason of its greater state of fluidity.

By use of my invention herein shown and described, the truck operator may interconnect his truck discharge line with the customer's intake pipe line; set the truck engine at a specific predetermined speed before any load is applied thereto; and then carry out further unloading operations at a substantially constant engine speed by manipulating valves, all without imposing any undue stress on the pump, piping and hose connections.

Figure 2:
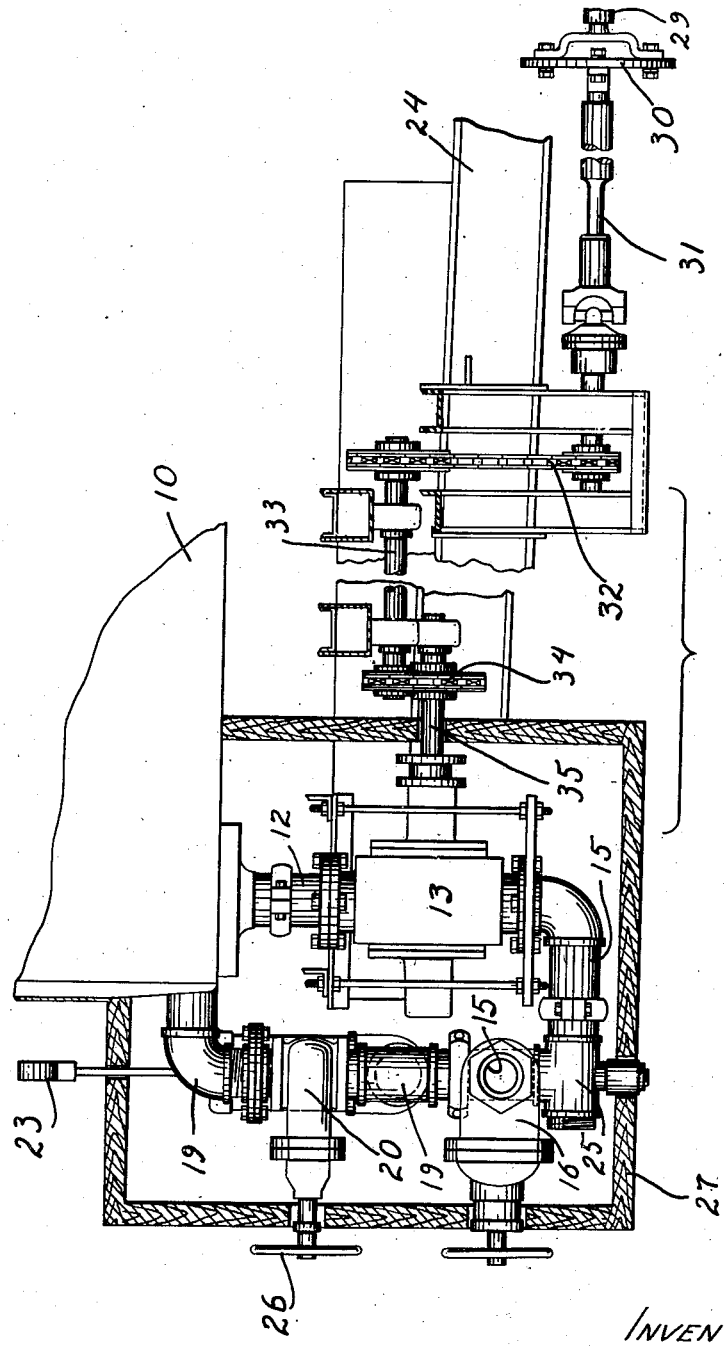
Figure 3:
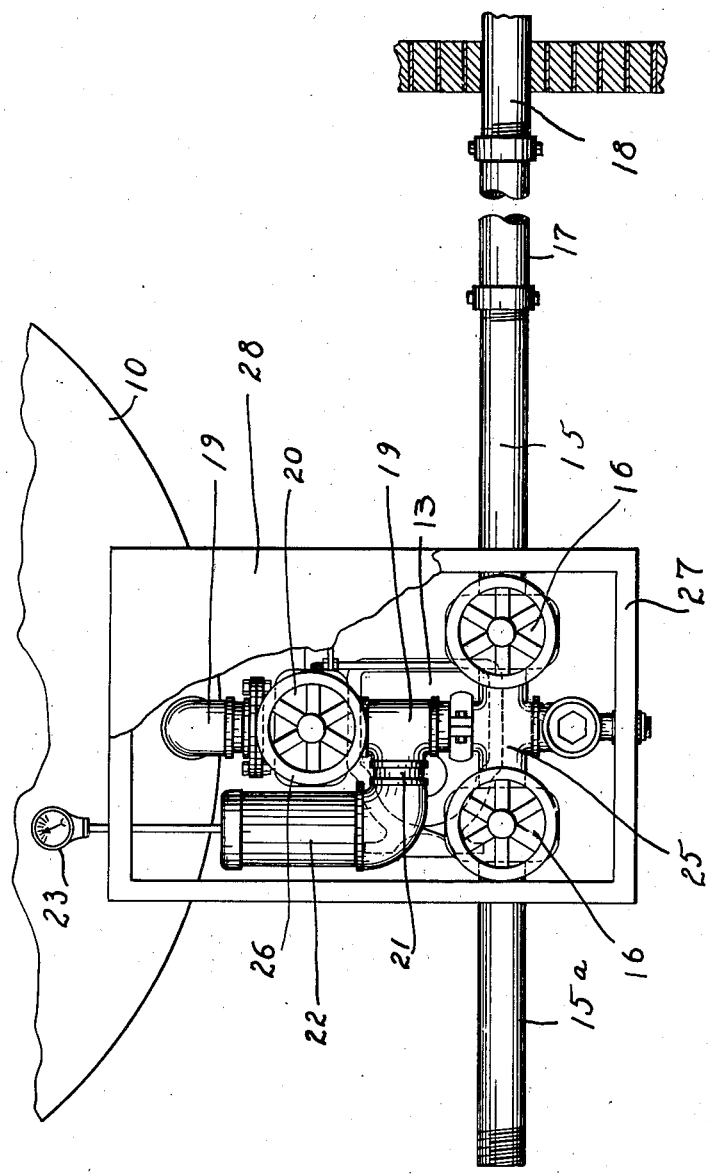

Other objects and advantages of the invention will become apparent to those versed in the art in the following description of one particular form of the invention as illustrated more or less diagrammatically in the accompanying drawings, in which Fig. 1 is a diagrammatic layout of a structure by which the invention may be carried out;

Fig. 2, a view in side elevation of one particular form of structure embodying the invention; and Fig. 3, a view in rear elevation.

Like characters of reference indicate like parts in the several views in the drawings.

Referring to Fig. 1, in general, the truck tank 10 is equipped with an outlet opening normally closed by a tank valve 11. From this tank opening leads a pipe line 12 to a discharge pump 13 that, through any suitable driving mechanism, is operated by the truck engine. From the pump 13, leads a discharge line 15 in which is placed a shut-off valve 16. A suitable connecting hose 17 is provided to interconnect the end of the pipe 15 with the customer's pipe line 18.

Interconnecting with that part of the pipe line 15 between the pump 13 and the valve 16 is a pipe line 19 which leads back and discharging into the truck tank 10, a valve 20 being interposed in this line 19 between the tank 10 and the main discharge line 15. Leading off from the pipe line 19 between its valve 20 and the interconnected line 15 is a pipe 21 leading to an air chamber 22, herein shown as generally cylindrical in form and carrying a pressure gauge 23 connected therewith to indicate pressures within the chamber 22.

Referring now to Figs. 2 and 3, this basic combination is mounted on the truck frame 24 carrying the tank 10, at any suitable location, herein shown as on the rear end thereof, the details of the mounting not being shown since they do not per se enter into the invention. In the application illustrated, the pump 13 is mounted under the tank 10 to receive its fluid from the tank by gravity flow and the line 15 leads from the underside of the pump rearwardly to connect with a fitting 25 from which the discharge line extends in two branches 15 and 15ª, the two branches being provided simply for convenience in this particular form so that the hose 17 may be selectively connected on the end of either the branch 15 or the branch 15ª to provide as short a coupling as possible with the customer's intake pipe 18. From the fitting 25, the pipe 19 leads upwardly with the valve 20 having a hand wheel 26 extending rearwardly for convenient operation. From the side of the pipe line 19 leads the connection 21 to the air chamber 22. It is to be noted that the valve 16 is duplicated in position and effect for the branch line 15ª so that flow may be selectively controlled to either of these branches. In order to preserve the initial heat applied to the corn syrup in the tank 10, the pump and the various valves are preferably surrounded by some insulating wall 27 preferaby having a rear removable cover 28. The compartment formed within this wall 27 may be heated by any suitable means, such as by running the exhaust of the truck engine through a muffler mounted therein or a pipe line carried therethrough (not shown).

The pump 13 is driven by any suitable mechanism, such as by the shaft 29 leading from a power take-off (not shown) on the truck through a flexible coupling 30; drive shaft 31; chain drive 32; shaft 33; chain drive 34; and the pump shaft 35. Through these chain drives, the suitable speed ratio may be obtained as between the pump speed and the engine speed.

Now assuming that the truck tank 10 has arrived at the customer's plant and that the corn syrup, as an example, is in a warm or heated state in the tank, the operator will open the tank outlet valve 11; the valve 16 having been initially placed in the closed condition; and the valve 20 is open. The pump 13 is set into operation by interconnection with the truck engine and then the operator takes up a position at the valves 16 and 20 and the pressure gauge 23. With the valve 16 closed, the valve 20 open, and the pump 13 operating, warm syrup is then circulated around through the pipe 12, pump 13, pipe 15, pipe 19, valve 20, and pipe 19 back into the truck tank. The pump then runs smoothly and with little effort while these various elements just enumerated are being cleared and warmed by the warm syrup.

While this circulating operation is being performed, the hose 17 is interconnected between the pipe 15 and the customer's pipe line 18. Then the valve 16 is opened to its full-open condition. The valve 20 is then slowly manipulated toward a closed position, the degree of operaton of the valve 20 being limited for the time being to build up a pressure in the air chamber, the extent of the pressure being observed by noting the pressure gauge 23. The valve 20 is not completely closed but is allowed to remain partially open to permit enough syrup to flow back through the pipe line 19 into the tank 10 to maintain a predetermined pressure in the air chamber and accordingly against the syrup in the customer's pipe line 18. This predetermined pressure will depend upon the length and the elevation to which the customer's pipe line 18 extends in each instance, but in any event this predetermined pressure will be limited to that which will permit operation of the pump 13 within its normal operating limits and without unduly high stresses, so that in no event will there be any occasion to damage the drive between the pump 13 and the truck motor or to stall or choke down the truck engine.

This predetermined pressure is maintained by manipulating the valve 20. The pressure would normally tend to drop after a period of time of application of that pressure upon the pipe line 18 since the steady push on the cold syrup in the line 18 will eventually set that cold syrup into motion although that motion is initially quite slow. Movement of that cold syrup would be accompanied by a tendency for the pressure to drop as noted at the gauge 23, and the valve 20 would then be turned toward a closed position a little further to maintain the predetermined pressure on the line 18, until finally the valve 20 may under most conditions be completely closed, although in some instances, the predetermined pressure may be such that the valve 20 will be finally left in a slightly open position in order to maintain the required delivery pressure.

All of this is accomplished while the pump 13 operates at its optimum speed for best performance, without any irregular or momentary applications thereto of excessive power. Therefore it is to be seen that by use of my invention, the customer's pipe line has initially applied thereto a pressure that will not immediately force the cold corn syrup to flow, but will be applied for a period of time to permit that pressure to be gradually transmitted through the pipe line to overcome the resistance of the normally high adhesion of the chilled high viscosity syrup to the pipe wall.

Further it is to be noted that the pump is initially started to circulate warm corn syrup to free the valves, pump inlet and pump outlet lines so as to prevent pounding and knocking that has heretofore occurred in the absence of the use of my invention.

In describing the invention, reference has been made to the cold syrup appearing in the customer's pipe line 18. Normally this line is drained following each delivery of a tank of syrup, but there will always be some syrup adhering to the pipe which will settle down and fill the lower portion of the pipe at least, and then the initial warm syrup delivered into that pipe line will chill until the line is warmed. It is the chilled syrup of these two conditions to which reference has been made. Furthermore it is to be noted that even though the residual chilled corn syrup remaining in the customer's pipe 18 is only that which is retained there by adhesion around the wall of the pipe, that coating will in itself reduce the normal cross-sectional area of the pipe to set up resistance to flow. In other words, the newly entering syrup encounters considerable resistance by its contact with the wall of the pipe or this chilled coating, it being kept in mind that the syrup has great adhesion to the pipe wall and, therefore, through this adhesion alone sets up a very high resistance to flow. It is also to be noted that the discharge pressure applied to the line 18 is always built up by manipulating the valve 20 and not by opening the truck engine throttle.

While I have herein shown and described my invention in the one particular form, it is obvious that structural variations may be employed without departing from the spirit of the invention and I therefore do not desire to be limited to that precise form beyond the limitations as may be imposed by the following claims.

I claim:

1. That method of starting a flow of normally highly viscous and highly adhesive fluid such as corn syrup through a pipe-line normally at a temperature below free flowing of the fluid, which comprises initially circulating a like fluid at a readily flowable temperature by a pump from a discharge thereof out of and back into a tank, interconnecting said discharge of the pump with said pipe-line and maintaining said circulatory flow, then restricting the circulatory flow while maintaining said pipe-line interconnection and at the same time maintaining a substantially constant pump speed to have the pump build up a predetermined limited pressure of the fluid on the pipe-line by reason of resistance to flow in the pipe-line and said restriction, maintaining that pressure substantially constant until said pressure induces a flow in the pipe-line as indicated by the tendency of said pressure to drop, and maintaining a substantially fixed pipe-line flow pressure by varying the restriction to said circulatory flow, increasing the restriction upon pressure drop and decreasing the restriction upon pressure rise.

2. That method of starting and maintaining a flow of normally highly viscous and adhesive fluid such as corn syrup through a pipe-line through which flow of fluid of the same characteristics has been previously had and discontinued, which comprises setting up a circulatory flow at substantially atmospheric pressure from a tank of heated like fluid by means of a pump whereby the temperature of the fluid in said flow becomes substantially that of said tank fluid the temperature of which is that permitting relatively free flow of the fluid but below the temperature of discoloration of the fluid, opening said pipe-line to said circulatory flow whereby pressures set up in that flow may be transmitted to the pipe-line restricting said flow in that part between said tank and said pipe-line opening whereby a predetermined pressure may be built up in said pipe-line by increase in pressure in said flow controlled by limiting flow of the fluid back to said tank, holding that predetermined pressure on the pipe-line until warmer fluid from said tank flows in the pipe-line, and then further restricting said circulatory flow to increase the volume of fluid flow in the pipe-line.

PAUL H. STAMBAUGH.